(12) United States Patent
Wang et al.

(10) Patent No.: US 10,645,963 B2
(45) Date of Patent: May 12, 2020

(54) FLAVOR EXTRACT OF LOW-TEMPERATURE-PRESSED PEANUT CAKE AND METHOD FOR USING THE SAME

(71) Applicant: Institute for Application of Atomic energy, Chinese Academy of Agricultural Sciences, Beijing (CN)

(72) Inventors: Qiang Wang, Beijing (CN); Hui Hu, Beijing (CN); Yunhua Liu, Beijing (CN); Lei Deng, Beijing (CN); Aimin Shi, Beijing (CN); Hongzhi Liu, Beijing (CN); Li Liu, Beijing (CN)

(73) Assignee: Institute for Application of Atomic Energy, Chinese Academy of Agricultural Sciences (CN)

( * ) Notice: Subject to any disclaimer, the term of this patent is extended or adjusted under 35 U.S.C. 154(b) by 231 days.

(21) Appl. No.: 15/697,101

(22) Filed: Sep. 6, 2017

(65) Prior Publication Data

US 2018/0295868 A1    Oct. 18, 2018

(30) Foreign Application Priority Data

Apr. 17, 2017    (CN) .......................... 2017 1 0249429

(51) Int. Cl.
*A23L 27/00*    (2016.01)
*A23L 27/10*    (2016.01)
(Continued)

(52) U.S. Cl.
CPC ................ *A23L 27/11* (2016.08); *A23D 9/04* (2013.01); *A23J 1/142* (2013.01); *A23L 5/32* (2016.08);
(Continued)

(58) Field of Classification Search
CPC .. A23L 27/11; A23L 5/32; A23D 9/04; A23V 2300/48; A23V 2002/00; A23V 2300/14
See application file for complete search history.

(56) References Cited

U.S. PATENT DOCUMENTS

2017/0258104 A1*    9/2017   Dierbach ............... A23C 11/06

FOREIGN PATENT DOCUMENTS

CN            105802721        *   7/2016

OTHER PUBLICATIONS

Nutrin Roasted Peanut Extract, 2001 (Year: 2001).*
(Continued)

*Primary Examiner* — Cephia D Toomer
(74) *Attorney, Agent, or Firm* — Mendelsohn Dunleavy, P.C.

(57) ABSTRACT

The present invention provides a flavor extract of low-temperature-pressed peanut cake which is extracted from low-temperature-pressed peanut cake. In the flavor extract, the content of pyrazines flavor substances is not less than 55%, and the content of the aldehydes substances is not more than 15%. The present invention also provides a method for improving the flavor of peanut oil by using the flavor extract of the low-temperature-pressed peanut cake. The flavor extract extracted from peanut cake according to the present invention, which contains 55% or more pyrazines flavor substances, can not only improve the flavor of low-temperature-pressed peanut oil significantly, but also retain the original quality and color of the low-temperature-pressed peanut oil when it is added to low-temperature-pressed peanut oil.

12 Claims, 2 Drawing Sheets

(51) Int. Cl.
A23D 9/04 (2006.01)
A23J 1/14 (2006.01)
A23L 5/30 (2016.01)

(52) U.S. Cl.
CPC ....... *A23V 2002/00* (2013.01); *A23V 2300/14* (2013.01); *A23V 2300/48* (2013.01)

(56) References Cited

OTHER PUBLICATIONS

Baker et al, Determination of Pyrazine and Flavor Variations in Peanut Genotypes During Roasting, 2003,Journal of Food Science, vol. 68, Nr. 1, pp. 394-400. (Year: 2003).*

Brown, et. al., Concentrations of Some Aliphatic Aldehydes and Ketones Found in Raw and Roasted Spanish and Runner Peanuts, 1973, Journal of the American Oil Chemists' Society, pp. 16-20, vol. 50 (Year: 1973).*

* cited by examiner

FLAVOR EXTRACT OF LOW-TEMPERATURE-PRESSED PEANUT CAKE AND METHOD FOR USING THE SAME

TECHNICAL FIELD

The present invention relates to the field of food technology, and particularly to a flavor substance extracted from peanut cake and a method for using the same.

BACKGROUND ART

Low-temperature-pressed peanut oil is produced with screened high-oil content peanuts as raw materials by low-temperature pressing (lower than 70° C.) and low-temperature cold filtering process. The produced peanut oil has light color and retains vitamin E, sterols, phospholipids, wheat germ phenols and other nutrients that are originally present in peanuts, and meanwhile low-denaturation peanut cakes are obtained. The process avoids serious denaturation and destruction of protein in peanut cakes caused by high temperature treatment, improves the comprehensive utilization rate of peanuts, and increases economic benefit. Although low temperature reduces the denaturation of peanut protein, some flavor substances that can be only formed at high temperature are not released due to the low temperature. Hence, low-temperature-pressed peanut oil has a light flavor, and cannot meet the demand for peanut oil flavor.

At present, there are mainly two methods to improve the flavor of peanut oil. In the first method, peanut meal is subjected to biological enzymolysis, then added with compound amino acids and reducing sugar to conduct thermal reaction, and then subjected to synchronous reaction and extraction with the low-temperature-pressed peanut oil as oil phase. After oil-water separation, the obtained peanut oil is a low-temperature-pressed peanut oil with intense flavor, which achieves improved flavor of low-temperature-pressed peanut oil. Although the peanut oil is not at high temperature during the whole preparation process of intense flavor peanut oil in this method, and the oxidation of peanut oil is effectively avoided, some harmful substances produced during enzymolysis of peanut meal and thermal reaction are dissolved in the enzymolysis solution and introduced into the peanut oil with intense flavor during the peanut oil extraction process, and water cannot be removed completely during oil-water separation, which greatly affect the quality of the low-temperature-pressed peanut oil with intense flavor. In the second method, low-temperature-pressed peanut meal is used as raw materials, stir-fried at a high temperature so that Maillard reaction occurs inside the peanut meal, and flavor substances specific for high-temperature-pressed peanut oil are generated, then mixed with peanut raw material, and pressed at 60° C. to obtain low-temperature-pressed peanut oil with intense flavor. The flavor substances generated in the process is natural flavor substances generated by baking peanut meal, but the browning color is generated in the peanut meal at high temperature, and some harmful substances will flow out with the peanut oil during the pressing process, and mixed in the low-temperature-pressed peanut oil, rendering the peanut oil deep in color and affecting the quality of peanut oil.

SUMMARY OF THE INVENTION

In view of the deficiencies in the art, an object of the present invention is to provide a flavor extract of low-temperature-pressed peanut cake.

A second object of the present invention is to provide application of the flavor extract of low-temperature-pressed peanut cake, i.e. to provide a method that not only can improve the flavor of low-temperature-pressed peanut oil significantly, but also retain the original quality and color of the low-temperature-pressed peanut oil.

The technical solutions for realizing the above object of the present invention are provided as follows:

The present invention provides a flavor extract of low-temperature-pressed peanut cake, which is extracted from low-temperature-pressed peanut cakes, wherein the mass content of pyrazines flavor substances in the flavor extract is not less than 55%, and the mass content of aldehydes substances is not more than 15%.

The flavor extract of low-temperature-pressed peanut cake is prepared by the following method: peanut cakes formed by low temperature pressing for one time is pretreated by baking and subjected to subcritical fluid extraction to obtain the flavor extract.

Preferably, the manner of baking is microwave baking for 2 minutes to 5 minutes or baking at 120° C. to 185° C. for 10 minutes to 20 minutes. More preferably, the manner of baking is microwave baking for 3 minutes or baking at 180° C. for 15 to 20 minutes. Wherein the solvent for the subcritical fluid extraction is one or two of diethyl ether, dichloromethane, butane, hexane and acetone; and the subcritical fluid extraction is conducted at a temperature of 30-50° C. for 2-5 times with the time for each extraction being 30 minutes to 45 minutes.

Use of the flavor extract of low-temperature-pressed peanut cake according to the present invention for improving the flavor of edible oil is provided.

The present invention provides a method for improving the flavor of peanut oil by using flavor extract of low-temperature-pressed peanut cake, comprising the step of adding the flavor extract of low-temperature-pressed peanut cake into a low-temperature-pressed peanut oil at a mass ratio of 1:10 to 1:20.

Further, the method may comprise the following steps:

a first step: the flavor extract of low-temperature-pressed peanut cake is added to low-temperature-pressed peanut oil; and a second step: the obtained mixture is treated by physical methods for a period of 1 to 15 minutes to obtain low-temperature-pressed peanut oil with intense flavor; the physical methods include one or more of ultrasonic treatment, standing at room temperature and microwave treatment.

The low-temperature-pressed peanut oil with intense flavor is obtained, wherein a relative content of the pyrazines flavor substances is not less than 55%, and a relative content of aldehydes substances is not more than 15%.

Preferably, the physical method is ultrasonic treatment, in which materials are placed into an ultrasonic cell disruptor, the operating time is 4 s to 6 s, the interval time is 3 s to 5 s, and the time for the whole ultrasonic treatment is 5 minutes to 10 minutes; after ultrasonic treatment, reaction is performed in a constant-temperature water bath oscillator at 40-50° C. for 1 h to 2 h. More preferably, the time for the whole ultrasonic treatment is 5 minutes to 7 minutes.

Wherein, the resulting mixture is placed in an ultrasonic treatment apparatus, and the power of the ultrasonic treatment apparatus is 200 W to 400 W.

Alternatively, the microwave power for the microwave treatment is 400 W to 800 W.

The present invention has the following advantageous effects:

The flavor extract extracted from peanut cake according to the present invention, which contains 55% or more pyrazines flavor substances, can not only improve the flavor of low-temperature-pressed peanut oil significantly, but also retain the original quality and color of the low-temperature-pressed peanut oil when it is added to low-temperature-pressed peanut oil.

The method provides a method for significantly improving the flavor of low-temperature-pressed peanut oil. The method has the advantages of simple operation, mild conditions, short processing time and remarkable flavor improvement. The flavor and other qualities of the peanut oil have good stability during storage, and the shelf life of low-temperature-pressed peanut oil is prolonged from 0.36 years to 3.20 years.

SPECIFIC MODES FOR CARRYING OUT THE EMBODIMENTS

Figure 1:
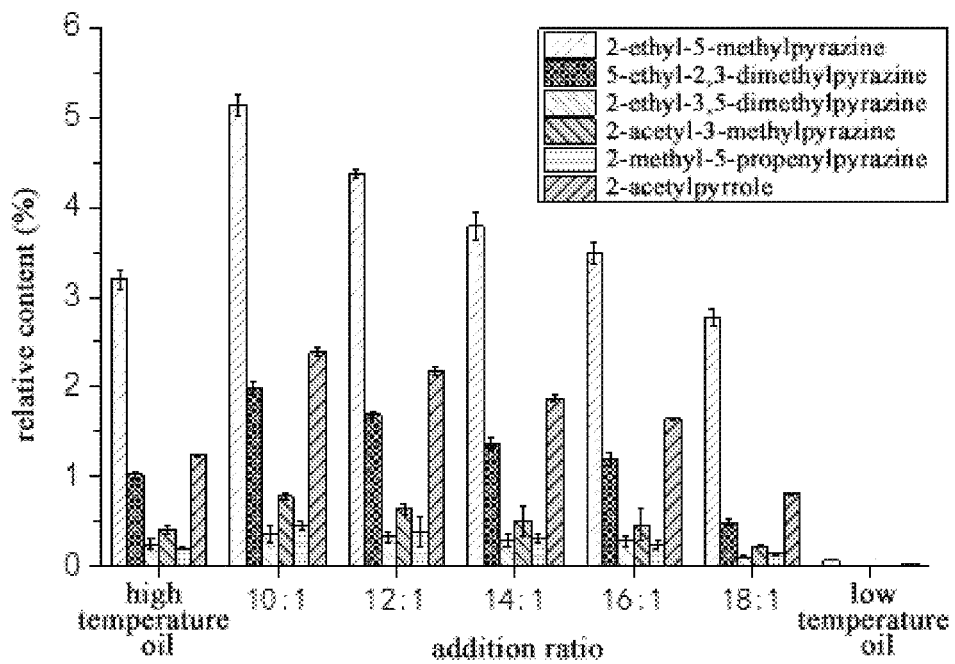
FIG. 1 shows the effect of addition ratios of the flavor extract on the characteristic flavor substances in low-temperature-pressed peanut oil according to Experimental Example 1 of the present invention.

The following examples are intended to illustrate the invention, but are not intended to limit the scope of the invention.

Unless otherwise specified, the technical means used in the embodiments are conventional means known to a person skilled in the art.

In the examples, the flavor substances were detected by headspace solid phase micro extraction-gas chromotography-mass spectrometry (HS-SPME-GC-MS), and the device was single quadrupole GC-MS QP2010 SE, Shimadzu Corporation, Japan. Extraction was carried out with 65 μm polydimethylsiloxane/divinylbenzene (PDMS/DVB, supelco, USA) extraction head. The flavor was evaluated by using electronic tongue Heracles II (Toulouse, French).

Peanut cakes formed by low temperature pressing for one time, and low-temperature-pressed peanut oil were provided by CHANGSHOU Group, high-temperature-pressed peanut oil was provided by the Jinsheng Cereals and Oils Industrial Co., Ltd, and the variety of peanut is Luhua 17.

The invention will be further described below with reference to the accompanying drawings and specific embodiments.

EXAMPLE 1

Optimization and Comparison of Pretreatment Conditions

Peanut cakes formed by low temperature pressing for one time were subjected to microwave baking with a microwave power of 525 W for 2, 3 and 4 minutes, respectively, and extracted by subcritical fluid (the solvent was butane, the subcritical temperature was 40° C., the time for each extraction was 40 min, and extraction was carried out three times) to give a flavor extract.

Peanut cakes formed by low temperature pressing for one time were subjected to oven baking for 5, 15, 25, 35, and 45 minutes, respectively, and extracted by subcritical fluid (the solvent was butane, the subcritical temperature was 40° C., the time for each extraction was 40 min, and extraction was carried out for three times) to give a flavor extract.

Main flavor substances in the products obtained by different pretreatment manners were detected by using HS-SPME-GC-MS, and the contents thereof were compared. The contents of pyrazines in the three kinds of peanut cakes treated by microwave baking were in the range of 35.06% to 48.5% of the total volatiles, and the contents of pyrazines in the five kinds of oven baked peanut cakes were in the range of 25.26 to 31.12% of the total volatiles. Hence, microwave baking is more favorable to the formation of pyrazines so as to generate strong baking flavor. However, with the increase of microwave heating intensity, the content of pyrazines increases first and then decreases, and the content of pyrazines obtained by microwave baking for 4 minutes was lower than that obtained by microwave baking for 3 minutes. In the extracts obtained by microwave baking and oven baking of low-temperature-pressed peanut cakes, the contents of pyrroles were 1.46%-13.71% and 5.67%-11.1% of total volatiles, respectively, and the contents of pyridines were 2.4%-6.25% and 0.85-3.48% of total volatiles, respectively. The detection data for two pretreatment manners, microwave baking and oven baking, were compared. Although the contents of pyrazines and other heterocyclic substances generated by microwave pretreatment was higher than that generated by oven pretreatment, the content of characteristic flavor substances generated by microwave pretreatment was significantly lower than that generated by oven pretreatment, especially the content of 2-ethyl-5-methylpyrazine generated by oven baking was much higher than that generated by microwave pretreatment. In comprehensive consideration of the total peak area of flavor and the content of characteristic flavor substances, oven was adopted for the pretreatment of peanut cakes in subsequent process.

EXAMPLE 2

Figure 2:
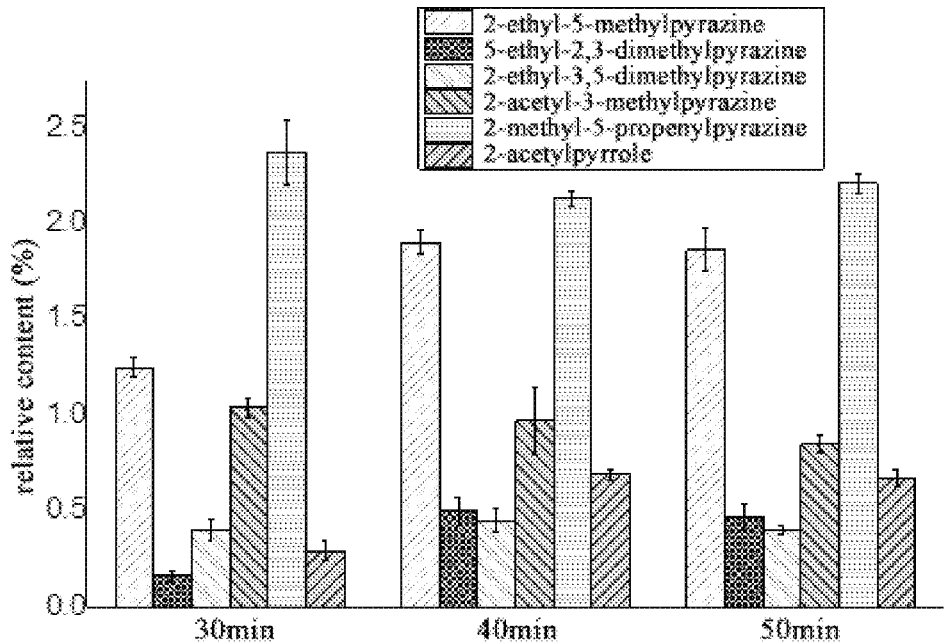
FIG. 2 shows the effect of different extraction time on the flavor extract of low-temperature-pressed peanut cake.

Peanut cakes formed by low temperature pressing for one time were oven baked at 180° C. for 15 minutes, and extracted with subcritical fluid, wherein the extraction solvent was butane, the subcritical temperature was 40° C., the time for each extraction was 30, 40, and 50 minutes, respectively, and the extraction was carried out for three times. Main flavor substances in the products obtained with different extraction time were detected by using HS-SPME-GC-MS. The comparison results are shown in FIG. 2. With the increase in extraction time, the sum of various flavor substances increases, and here was no significant difference for the extraction time of 40 min and 50 min. Hence, 40 min was taken as an appropriate extraction time.

EXAMPLE 3

Peanut cakes formed by low temperature pressing for one time were oven baked at 180° C. for 15 minutes, and extracted with subcritical fluid (the extraction solvent was butane, the subcritical temperature was 40° C., the time for each extraction was 40 minutes, and the extraction was carried out for three times). The relative content of pyrazines flavor substances in the flavor extract was not less than 55%, and the relative content of aldehydes was not more than 15%.

9 classes of volatile substances including aldehydes, ketones, hydrocarbons, pyrazines, furanes, pyrroles, pyridines, amines and other compounds, which total 119 kinds, were detected by HS-SPME-GC-MS in the flavor extract of peanut cakes, wherein the relative contents of three major aldehydes, pyrazines and pyrroles are 10.08%, 59.01% and 13.21%, respectively.

EXAMPLE 4

A method for improving the flavor of low-temperature-pressed peanut oil, comprising the following steps:

a first step: the flavor extract obtained from Example 3 was added to low-temperature-pressed peanut oil with low-temperature-pressed peanut oil: the flavor extract mass ratio=1:14, wherein the content of the resulted pyrazines relative to the volatiles was 69%, and the content of aldehydes relative to the low-temperature-pressed peanut oil mixture with intense flavor was 9%;

a second step: the low-temperature-pressed peanut oil mixture with intense flavor was placed into an ultrasonic cell disruptor (KQ-500DE, Kunshan Ultrasonic Instrument Co., Ltd.) to prepare for the next step, wherein the power for ultrasonic cell disruption was 300 W, the operating time was 5 s, the interval time was 4 s, and the time for the whole treatment was 6 minutes; and a third step: after undergoing ultrasonic cell disruption, the mixture from the second step was allowed to react for 1.4 h in a constant-temperature water bath shaker at 45° C. to give low-temperature-pressed peanut oil with intense and stable flavor.

Oxidation experiment was performed on the low-temperature-pressed peanut oil with intense flavor at 110° C. and 130° C. The shelf life of the low-temperature-pressed peanut oil with intense flavor was calculated to be 3.20 year, which is significantly higher than the 1.64 year for low-temperature-pressed peanut oil without the flavor extract and the 1.16 years for high-temperature-pressed peanut oil.

EXAMPLE 5

A method for improving the flavor of low-temperature-pressed peanut oil was carried out as described in Example 4 except that microwave treatment for 1 minute with a microwave power of 525 W was adopted in the second step.

The above method was used to improve the flavor of low-temperature-pressed peanut oil. The low-temperature-pressed peanut oil with intense flavor was final obtained, with a relative content of pyrazines obtained finally being 62% and a relative content of aldehydes being 11%.

EXAMPLE 6

A method for improving the flavor of low-temperature-pressed peanut oil was carried out as described in Example 4 except that the addition amount of the flavor extract in the first step was 1:16 and the time for the whole ultrasonic treatment was 9 min. The above method was used to improve the flavor of low-temperature-pressed peanut oil. The low-temperature-pressed peanut oil with intense flavor final obtained, with a relative content of pyrazines obtained finally being 51% and a relative content of aldehydes being 14%.

EXAMPLES 7-9

A method for improving the flavor of low-temperature-pressed peanut oil was carried out as described in Example 4 except that the addition amounts of the flavor extracts in the first step were 1:10, 1:12, and 1:18, respectively.

The products obtained from Examples 4, 6, and 7-9 were detected by GC-MS. The histogram in FIG. 1 shows the main flavor substances: 2-ethyl-5-methylpyrazine, 5-ethyl-2,3-dimethylpyrazine, 2-ethyl-3,5-dimethylpyrazine, 2-acetyl-3-methylpyrazine, 2-methyl-5-propenylpyrazine, and 2-acetylpyrrole. By comparing the products with high-temperature-pressed peanut oil (high temperature oil in the figure) and blank low-temperature-pressed peanut oil without the flavor extract (low temperature oil in the figure), it can be known that the method of the present invention significantly improves the flavor of low-temperature-pressed peanut oil. In comprehensive consideration of the several kinds of flavor substances, the peanut oils of Example 4 and Example 6 were most balanced in flavor.

EXAMPLES 10-11

A method for improving the flavor of low-temperature-pressed peanut oil was carried out as described in Example 4 except that the addition amount of the flavor extract in the first step was 1:16 and the ultrasonic time was 3 minutes and 12 minutes, respectively.

Figure 3:
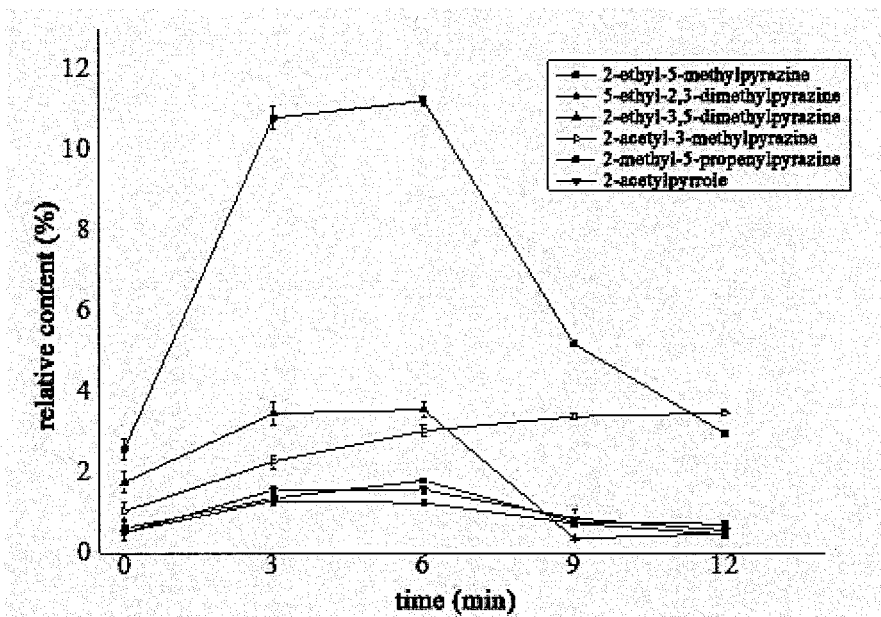
FIG. 3 shows the effect of different ultrasonic time on the characteristic flavor substances in low-temperature-pressed peanut oil.

Example 4, Example 6, and Examples 10-11 were compared, and the effects of different ultrasonic time on the characteristic flavor substances in peanut oil were shown in FIG. 3. It can be seen that, ultrasonic treatment for 5-7 minutes is a treatment manner that is both economical and good in effect.

Figure 4:
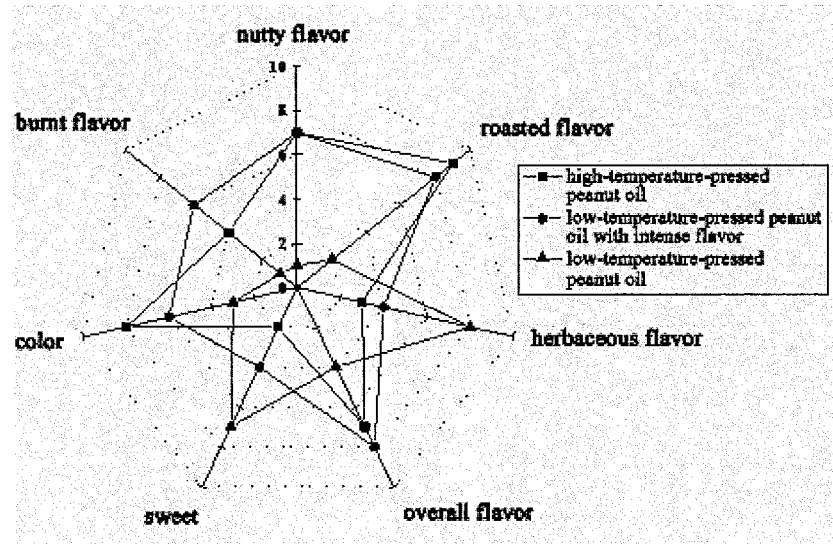
FIG. 4 is a radar chart for flavor evaluation of the different types of peanut oil.

The low-temperature-pressed peanut oil with intense flavor obtained from Example 4, the low-temperature-pressed peanut oil without the flavor extract and high-temperature-pressed peanut oil were detected with the electronic tongue. The results were shown in FIG. 4. The low-temperature-pressed peanut oil with intense flavor has the best overall flavor.

Low-temperature-pressed peanut oil was improved in flavor by the method according to the present invention. The final low-temperature-pressed peanut oil with intense flavor has similar flavor to high-temperature-pressed peanut oil, the relative content of the characteristic flavor substances therein reaches 69%, and the relative content of the aldehydes is 9%. The peanut oil has high oxidative stability, and retains the original quality and color of low-temperature-pressed peanut oil.

The foregoing is only preferred embodiments of the present invention. It should be noted that it will be apparent to those skilled in the art that certain improvements and modifications may be made without departing from the technical principles of the present invention, and these improvements and modifications should also be regarded as within the protection scope of the present invention.

What is claimed is:

1. A flavor extract of low-temperature-pressed peanut cake, wherein the flavor extract is extracted from low-temperature-pressed peanut cake, the mass content of pyrazines flavor substances in the flavor extract is not less than 55% of a total weight of the flavor extract, and the mass content of aldehydes substances ranges from greater than 0 to 15% of the total weight of the flavor extract.

2. The flavor extract of low-temperature-pressed peanut cake according to claim 1, wherein the flavor extract is prepared by the following method: peanut cakes formed by low temperature pressing for one time are pretreated by baking and subjected to subcritical fluid extraction to obtain the flavor extract.

3. The flavor extract of low-temperature-pressed peanut cake according to claim 2, wherein the pretreated manner is microwave baking for 2 to 5 minutes or baking at 120° C. to 185° C. for 10 to 20 minutes.

4. The flavor extract of low-temperature-pressed peanut cake according to claim 2, wherein a solvent for the subcritical fluid extraction is one or two of diethyl ether, dichloromethane, butane, hexane and acetone; and the subcritical fluid extraction is conducted at a temperature of 30-50° C. for 2-5 times with the time for each extraction being 30-45 minutes.

5. A method of improving the flavor of edible oil comprising the step of adding the flavor extract of low-temperature-pressed peanut cake according to claim 1 to edible oil.

6. A method of improving the flavor of edible oil comprising the step of adding the flavor extract of low-temperature-pressed peanut cake according to claim 2 to edible oil.

7. A method of improving the flavor of edible oil comprising the step of adding the flavor extract of low-temperature-pressed peanut cake according to claim 3 to edible oil.

8. A method of improving the flavor of edible oil comprising the step of adding the flavor extract of low-temperature-pressed peanut cake according to claim 4 to edible oil.

9. The method according to claim 6, comprising the steps of:
a first step: adding the flavor extract of low-temperature-pressed peanut cake into low-temperature-pressed peanut oil; and
a second step: the obtained mixture from the first step is allowed to stand at room temperature or is treated by physical methods for a period of 1 to 15 minutes to obtain low-temperature-pressed peanut oil with intense flavor; the physical methods include one or more of ultrasonic treatment and microwave treatment.

10. The method according to claim 9, wherein the obtained mixture is treated by a physical method and the physical method is ultrasonic treatment, in which materials are placed into an ultrasonic cell disruptor, the operating time is 4 s to 6 s, the interval time is 3 s to 5 s, and the time for the whole treatment is 5 minutes to 10 minutes; after ultrasonic treatment, reaction is performed in a constant-temperature water bath oscillator at 40-50° C. for 1 h to 2 h.

11. A method according to claim 9, wherein the obtained mixture is placed in an ultrasonic treatment apparatus, and the power of the ultrasonic treatment apparatus is 200 W to 400 W.

12. The method according to claim 7, wherein the microwave power for the microwave treatment is 400 W to 800 W.

* * * * *